US012450957B2

(12) United States Patent
Nakazawa et al.

(10) Patent No.: US 12,450,957 B2
(45) Date of Patent: Oct. 21, 2025

(54) ENGINE DIAGNOSIS METHOD AND ENGINE DIAGNOSIS DEVICE

(71) Applicant: NISSAN MOTOR CO., LTD., Yokohama (JP)

(72) Inventors: Satoshi Nakazawa, Yokohama (JP); Isei Matsuzaki, Yokohama (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 203 days.

(21) Appl. No.: 18/344,706

(22) Filed: Jun. 29, 2023

(65) Prior Publication Data
US 2024/0005707 A1 Jan. 4, 2024

(30) Foreign Application Priority Data

Jun. 30, 2022 (JP) ................................ 2022-106381

(51) Int. Cl.
*G07C 5/08* (2006.01)
(52) U.S. Cl.
CPC .................................. *G07C 5/0808* (2013.01)
(58) Field of Classification Search
CPC .................. G07C 5/0808; F02D 29/02; F02D 2041/1432; F02D 2200/1002; F02D 2200/1004; F02D 2250/18; F02D 41/22
See application file for complete search history.

(56) References Cited

U.S. PATENT DOCUMENTS

| | | | |
|---|---|---|---|
| 5,692,472 A | 12/1997 | Bederna et al. | |
| 7,463,970 B2 * | 12/2008 | Livshiz | F02D 11/105 |
| | | | 123/399 |
| 7,844,404 B2 * | 11/2010 | Ling | F02C 9/00 |
| | | | 702/41 |
| 10,247,124 B2 * | 4/2019 | Johansson | F02D 41/248 |
| 2004/0055567 A1 * | 3/2004 | Doelker | F02D 41/222 |
| | | | 123/350 |
| 2008/0125951 A1 * | 5/2008 | Livshiz | F02D 11/105 |
| | | | 701/101 |
| 2009/0299602 A1 * | 12/2009 | Hartrey | F02D 41/1497 |
| | | | 701/102 |

(Continued)

FOREIGN PATENT DOCUMENTS

| | | |
|---|---|---|
| JP | H09-112326 A | 4/1997 |
| JP | 2018-105305 A | 7/2018 |

*Primary Examiner* — Abdalla A Khaled
(74) *Attorney, Agent, or Firm* — Foley & Lardner LLP

(57) ABSTRACT

An engine diagnosis method includes: a step of calculating a corrected command torque $T_{trg2}$ by correcting a command torque $T_{trg}$ of an engine 1 with a correction amount according to a response characteristic of an engine torque T actually output with respect to the command torque $T_{trg}$; and a step of diagnosing a state of the engine torque T by comparing a diagnostic torque $T_{dia}$ defined based on the corrected command torque $T_{trg2}$ and an estimated torque $T_{act}$. Particularly, in this engine diagnosis method, the correction amount is adjusted with reference to an operating state of the engine 1.

6 Claims, 8 Drawing Sheets

(56) References Cited

U.S. PATENT DOCUMENTS

| | | | |
|---|---|---|---|
| 2012/0283900 A1* | 11/2012 | Brandel | B60W 50/0205 903/902 |
| 2013/0073127 A1* | 3/2013 | Kumar | F02D 41/1498 73/114.15 |
| 2016/0090101 A1* | 3/2016 | Kiebel | F02D 37/02 701/101 |
| 2017/0002763 A1* | 1/2017 | Oono | F02D 11/105 |
| 2017/0254726 A1* | 9/2017 | Das | F02D 29/02 |
| 2017/0350331 A1* | 12/2017 | Shost | F02D 41/0087 |
| 2018/0135541 A1* | 5/2018 | Hsieh | F02D 37/02 |
| 2019/0188927 A1* | 6/2019 | Kageyama | B60W 10/06 |
| 2020/0386177 A1* | 12/2020 | Yuan | F02P 5/1502 |

\* cited by examiner

ENGINE DIAGNOSIS METHOD AND ENGINE DIAGNOSIS DEVICE

CROSS REFERENCE TO RELATED APPLICATIONS

This application claims priority based on Japanese Patent Application No. 2022-106381, filed in the Japan Patent Office on Jun. 30, 2022, and the entire contents of this application are incorporated herein by reference.

FIELD OF THE INVENTION

The present invention relates to an engine diagnosis method and an engine diagnosis device.

BACKGROUND OF THE INVENTION

JP2018-105305A discloses a method of monitoring a difference between a target torque and an estimated torque of an engine installed in a vehicle, and diagnosing the engine as abnormal by determining that excessive torque is output (abnormal torque state) when the difference exceeds a certain level.

Particularly, in the method of JP2018-105305A, the target torque determined from an accelerator position (accelerator opening degree) of a driver and an engine revolution speed is corrected by being applied with a predetermined filter, and the state of the engine torque is diagnosed by monitoring the difference between the corrected target torque and the estimated torque.

However, a response characteristic (following performance) of the engine torque that is actually output with respect to the target torque changes according to operating states of the engine such as the magnitude of the engine torque and the engine revolution speed. For this reason, as in the method described in JP2018-105305A, the corrected target torque calculated by uniformly filtering the target torque may deviate from the actual behavior of the engine torque depending on the operating state of the engine. As a result, there is a problem that accuracy in diagnosing the torque state based on the difference between the corrected target torque and the estimated torque cannot be sufficiently ensured.

Accordingly, an object of the present invention is to ensure the accuracy in diagnosing the state of the engine torque regardless of the operating state of the engine.

BRIEF SUMMARY OF THE INVENTION

According to one embodiment, a corrected command torque is calculated by correcting a command torque of the engine with a correction amount according to a response characteristic of an engine torque actually output with respect to the command torque, and a state of the engine torque is diagnosed by comparing a diagnostic torque determined based on the corrected command torque and an estimated torque. Then, in this engine diagnosis method, the correction amount is adjusted with reference to an operating state of the engine.

According to the above embodiment, it is possible to ensure the accuracy in diagnosing the state of the engine torque regardless of the operating state of the engine.

DETAILED DESCRIPTION OF THE INVENTION

Hereinafter, an engine control method according to an embodiment of the present invention will be described with reference to the drawings.

[Overall Configuration of Engine]

Figure 1:
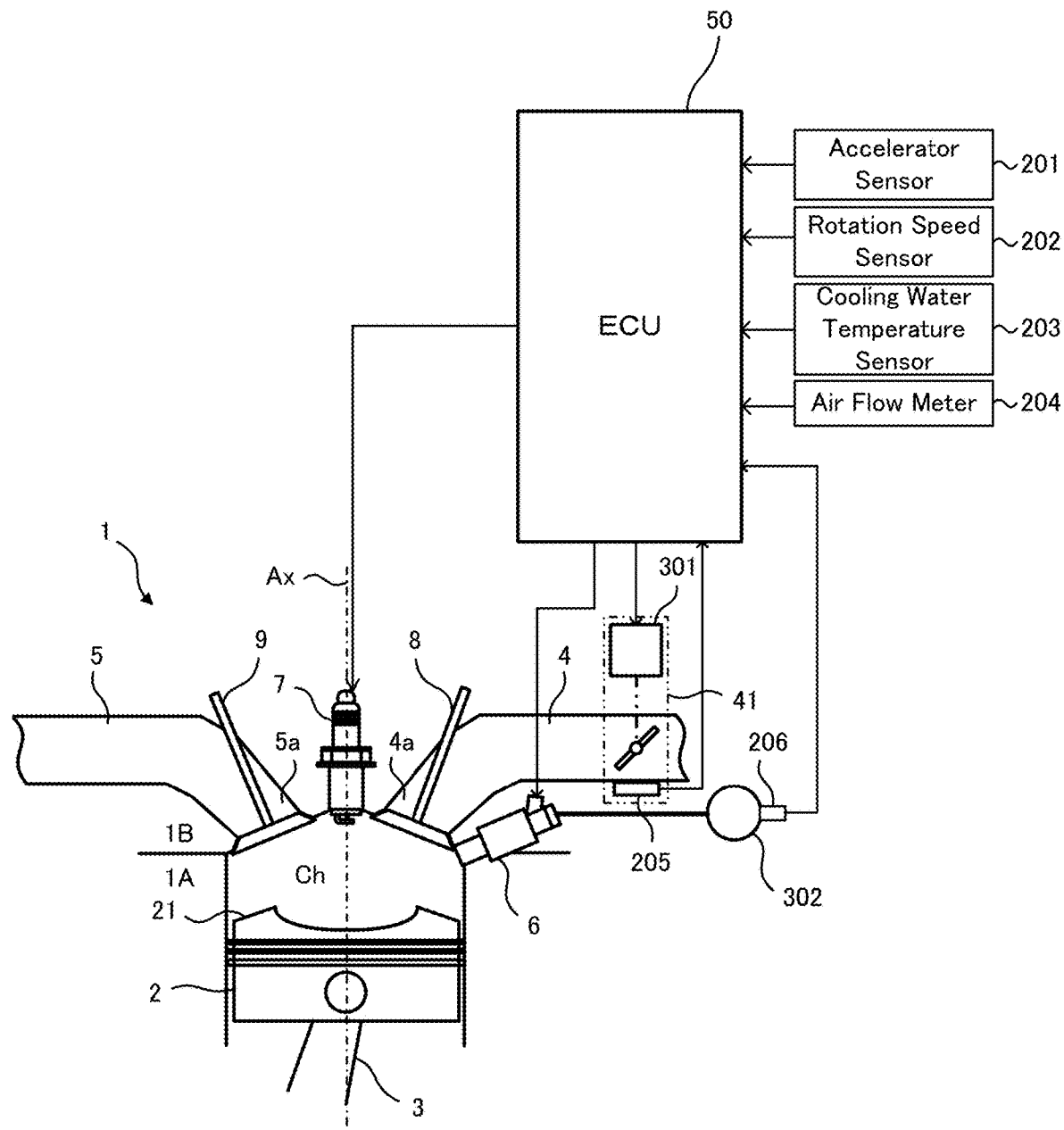
FIG. 1 is an overall configuration diagram of an engine to which an engine diagnosis method according to an embodiment of the present invention is applicable.

FIG. 1 is an overall configuration diagram of an engine 1 to which an engine diagnosis method according to the present embodiment is applicable. Note that in the present embodiment, description will be given on the assumption that the engine 1 is mounted in a vehicle as a drive source.

In the present embodiment, the engine 1 is a direct fuel injection engine, and fuel can be directly injected into a cylinder thereof. The engine 1 is not limited to the direct injection engine, and may be a port injection engine in which fuel is injected into an intake port 4a of an intake passage 4. Although FIG. 1 shows only one cylinder for convenience, the number of cylinders is not limited to one and may be plural.

A main body of the engine 1 is formed by a cylinder block 1A and a cylinder head 1B, and a cylinder is formed as a space surrounded by the cylinder block 1A and the cylinder head 1B.

A piston 2 is inserted into the cylinder block 1A in a manner of being capable of reciprocating in an up-down direction along a cylinder central axis Ax, and the piston 2 is connected to a crankshaft (not shown) via a connecting rod 3. Reciprocating motion of the piston 2 is transmitted to the crankshaft through the connecting rod 3 and converted into rotational motion of the crankshaft. A cavity is formed in a top surface 21 of the piston 2. This cavity can prevent a smooth flow of air drawn into the cylinder through a port portion (intake port 4a) of the intake passage 4 from being obstructed by the top surface 21 of the piston 2, and fuel injected by a fuel injection valve 6 can be guided by a wall surface of this cavity toward an ignition plug 7.

The cylinder head 1B includes a lower surface that defines a pent-roof type combustion chamber Ch. The combustion chamber Ch is formed as a space surrounded by the lower surface of the cylinder head 1B and the top surface 21 of the piston 2. In the cylinder head 1B, a pair of intake passages 4 are formed on one side of the cylinder central axis Ax, and a pair of exhaust passages 5 are formed on the other side of the cylinder central axis Ax as passages for allowing the combustion chamber Ch to communicate with outside of the engine 1. An intake valve 8 is disposed at the port portion (intake port) 4a of each intake passage 4, and an exhaust valve 9 is disposed at a port portion (exhaust port) 5a of each exhaust passage 5. Air taken from the outside of the engine 1 into the intake passage 4 is sucked into the cylinder while the intake valve 8 is open, and exhaust after combustion is discharged into the exhaust passage 5 while the exhaust valve 9 is open.

An electronically controlled throttle device 41 is disposed in the intake passage 4, and the electronically controlled throttle device 41 controls a flow rate of air taken into the cylinder through the intake passage 4.

The electronically controlled throttle device 41 includes a butterfly valve as a valve body, and a rotational shaft of the valve body is connected to an actuator (hereinafter referred to as "throttle actuator") 301, and the throttle actuator 301 controls a rotational position of the valve body (hereinafter referred to as "throttle position").

In the cylinder head 1B, the ignition plug 7 is further disposed between the intake port 4a and the exhaust port 5a along the cylinder central axis Ax, and on the one side of the cylinder central axis Ax, the fuel injection valve 6 is disposed between the pair of intake ports 4a, 4a. The fuel injection valve 6 is supplied with fuel from a fuel accumulator (high-pressure fuel pipe) 302 leading to a fuel tank (not shown), and is configured and disposed to inject the fuel directly into the cylinder.

A catalyst converter (not shown) is interposed in the exhaust passage 5, and the catalyst converter accommodates a catalyst for purifying exhaust gas. In the present embodiment, an exhaust gas purification device is a three-way catalyst, and the exhaust gas after combustion discharged into the exhaust passage 5 is released into the atmosphere after harmful components such as nitrogen oxides (NOx), carbon monoxide (CO) and hydrocarbons (HC) are purified by the exhaust gas purifying catalyst.

[Engine Control System Configuration]

Operation of the engine 1 is controlled by an electronic control unit 50. The electronic control unit 50 includes a microcomputer including a central processing unit (CPU), various storage devices such as a RAM and a ROM, an input and output interface, and the like. The electronic control unit 50 receives detection signals from an accelerator sensor 201, a rotation speed sensor 202, and a cooling water temperature sensor 203, as well as detection signals from an air flow meter 204, a throttle sensor 205, a combustion pressure sensor 206, an air-fuel ratio sensor (not shown), and the like. Particularly, the electronic control unit 50 is programmed to execute processing shown in FIGS. 2, 3, and 6, which will be described later, after receiving the detection signals from various sensors.

The accelerator sensor 201 detects an operation amount of an accelerator pedal by a driver (hereinafter referred to as "accelerator operation amount APO"). The accelerator operation amount APO is an index of a load required for the engine 1. The revolution speed sensor 202 detects a revolution speed of the engine 1. A crank angle sensor can be used as the revolution speed sensor 202, and the revolution speed is detected by converting a signal (unit crank angle signal) output for each unit crank angle or a signal (reference crank angle signal) output for each reference crank angle by the crank angle sensor into the revolution speed per unit time (for example, the revolution speed per minute, hereinafter referred to as "engine revolution speed $N_e$"). The cooling water temperature sensor 203 detects a temperature of engine cooling water. A temperature of engine lubricating oil may be used instead of the temperature of the engine cooling water.

The air flow meter 204 is disposed at an introduction portion of the intake passage 4 and detects a flow rate of air taken into the engine 1 (intake air amount). In the present embodiment, the air flow meter 204 is implemented by a hot wire flow meter. The throttle sensor 205 detects the rotational position (throttle position) of the valve body of the electronically controlled throttle device 41. In the present embodiment, the throttle sensor 205 is implemented by a potentiometer and assembled to the electronically controlled throttle device 41. The combustion pressure sensor 206 is disposed in the high-pressure fuel pipe 302 and detects a pressure of the fuel supplied to the fuel injection valve 6. The air-fuel ratio sensor is disposed in the exhaust passage 5 and detects an air-fuel ratio of the exhaust.

The electronic control unit 50 includes a storage device that holds map data in which various operation control quantities such as a target torque are allocated according to the operating state such as the load, the revolution speed, and the cooling water temperature of the engine 1. Then, during actual operation of the engine 1, the map data in the storage device is referenced based on the operating state of the engine 1 to set a fuel injection amount, a fuel injection timing, an ignition timing, and the like.

Next, contents of control executed by the electronic control unit 50 will be described with reference to a flow chart.

Figure 2:
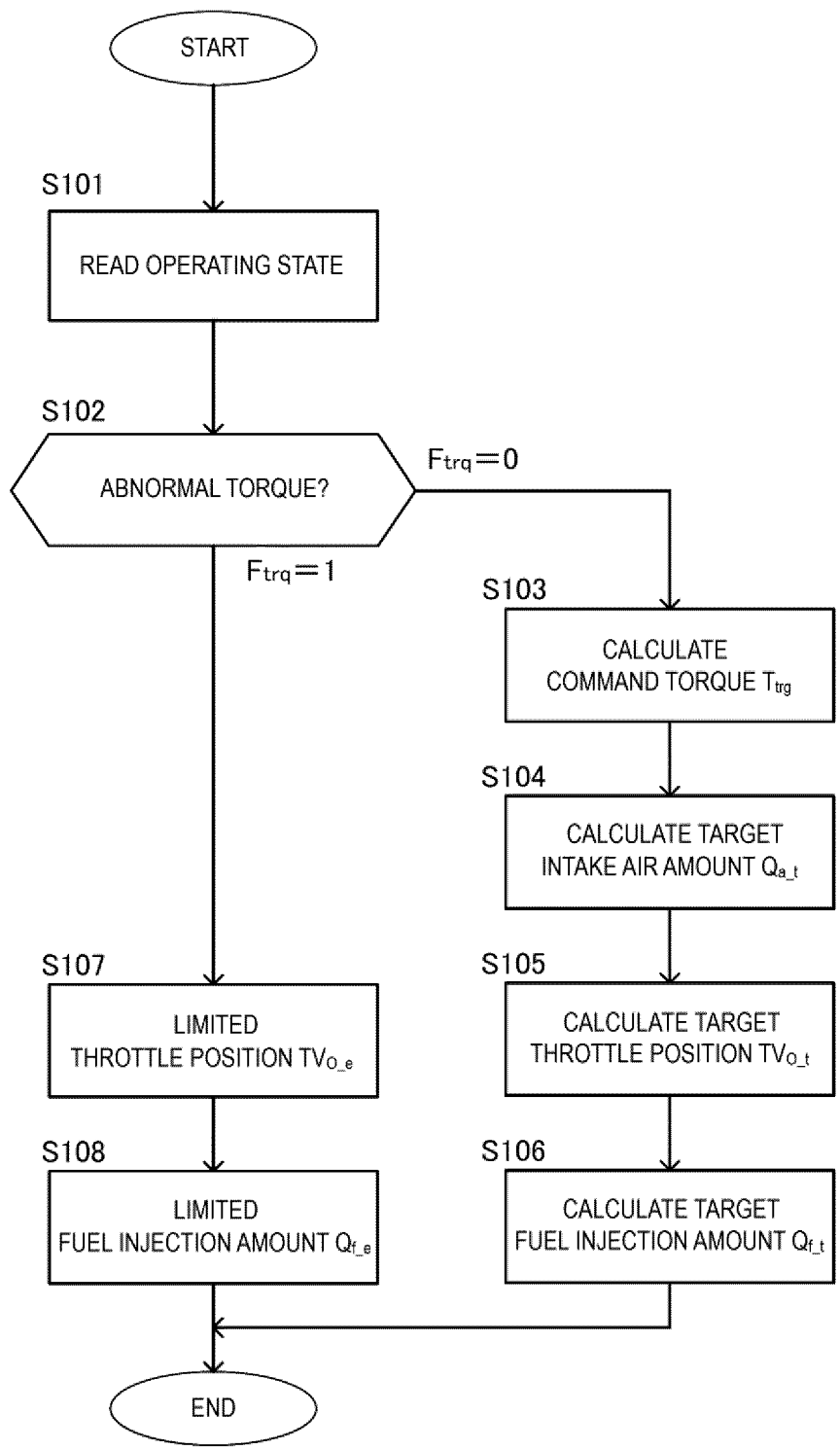
FIG. 2 is a flow chart schematically showing a flow of engine control.

FIG. 2 is a flow chart schematically showing a flow of a basic routine for engine control according to the present embodiment. The electronic control unit 50 executes the control routine shown in FIG. 2 at a predetermined time interval.

In S101, as parameters indicating the operating state of the engine 1, the accelerator operation amount APO, the engine revolution speed $N_e$, a cooling water temperature Tw, a fuel pressure Pf, and the like are read.

In S102, as a result of abnormal torque determination, an abnormality determination flag $F_{trq}$ is read, and if a value thereof is 0, the processing proceeds to S103, and if the value thereof is 1, the processing proceeds to S107. The abnormality determination flag $F_{trq}$ is set to 0 when a vehicle equipped with the engine 1 is shipped from a manufacturing plant or delivered from a maintenance plant, and is set to 0 or 1 depending on a result of comparison between an estimated value of a torque actually generated by the engine 1 (hereinafter referred to as "estimated torque $T_{act}$") and a diagnostic torque $T_{dia}$, by the abnormal torque determination processing shown in FIG. 3. Note that the abnormality determination flag $F_{trq}$ is kept at 1 even after the engine 1 is stopped when changed from 0 to 1, and is rewritten to 0 when necessary repairs are completed at the maintenance plant.

In S103, a command torque $T_{trg}$ is calculated based on the accelerator operation amount APO and the engine revolution speed $N_e$. Here, the command torque $T_{trg}$ is a command value for a torque generated by the engine 1 (hereinafter also simply referred to as "engine torque T"), and is determined based on an acceleration request from the driver (accelerator operation amount APO). Note that the command torque $T_{trg}$ is calculated by referring to the map data in which the command torque $T_{trg}$ is allocated according to the accelerator operation amount APO and the engine revolution speed $N_e$.

In S104, a target value of the intake air amount (target intake air amount $Q_{a\_t}$) corresponding to the command torque $T_{trg}$ is calculated. The target intake air amount $Q_{a\_t}$ is set to a larger value as the command torque $T_{trg}$ increases.

In S105, a target value of the throttle position (target throttle position $TV_{O\_t}$) is calculated based on the target intake air amount $Q_{a\_t}$ and the engine revolution speed $N_e$.

The target throttle position $TV_{O\_t}$ is calculated by referring to the map data in which the target throttle position $TV_{O\_t}$ corresponding to the target intake air amount $Q_{a\_t}$ is allocated for each engine revolution speed $N_e$. The electronic control unit 50 sets a drive signal corresponding to the target throttle position $TV_{O\_t}$, and outputs the drive signal to the electronically controlled throttle device 41.

In S106, a target value of the fuel injection amount (target fuel injection amount $Q_{f\_t}$) corresponding to the target intake air amount $Q_{a\_t}$ is calculated. The target fuel injection amount $Q_{f\_t}$ is set to a larger value as the target intake air amount $Q_{a\_t}$ increases. The target fuel injection amount $Q_{f\_t}$ obtained in this manner is corrected according to the cooling water temperature Tw and the like to calculate the final target fuel injection amount $Q_{f\_t}$. The electronic control unit 50 sets a drive signal according to the target fuel injection amount $Q_{f\_t}$ and the fuel pressure Pf, and outputs the drive signal to the fuel injection valve 6. In the present embodiment, the target fuel injection amount $Q_{f\_t}$ is set to be equivalent to the target intake air amount $Q_{a\_t}$, but when the target air-fuel ratio is switched according to the operating region of the engine 1, the target air-fuel ratio can be taken into consideration when calculating the target fuel injection amount $Q_{f\_t}$.

In S107 and S108, the engine control based on the accelerator operation amount APO or the command torque $T_{trg}$ is prohibited, and the operation of the engine 1 is limited. In other words, the engine torque T is limited to a value smaller than the command torque $T_{trg}$ corresponding to the accelerator operation amount APO.

In S107, the throttle position $TV_O$ of the electronically controlled throttle device 41 is set to a limited throttle position $TV_{O\_e}$ smaller than the target throttle position $TV_{O\_t}$ corresponding to the accelerator operation amount APO. In the present embodiment, the limited throttle position $TV_{O\_e}$ is a fixed value or a calculated value that is sufficient to allow the vehicle to travel at a low speed toward the maintenance plant or to evacuate. The electronic control unit 50 outputs a limit command signal to the electronically controlled throttle device 41. Then, the electronically controlled throttle device 41 receives the limit command signal from the electronic control unit 50 and drives the valve body to a rotational position corresponding to the limited throttle position $TV_{O\_e}$ by the throttle actuator 301. Here, the "limit command signal" corresponds to a "control signal" generated to limit the operation of the engine 1.

In S108, a fuel injection amount $Q_f$ is set to a limited fuel injection amount $Q_f$e smaller than the target fuel injection amount $Q_{f\_t}$ corresponding to the accelerator operation amount APO, and the vehicle is prohibited from traveling at a vehicle speed exceeding a predetermined vehicle speed (for example, 30 km/h).

In the present embodiment, if the abnormality determination flag $F_{trq}$ is determined to be 1 in the determination step shown in S102, while limiting the operation of the engine 1 by the processing shown in S107 and S108, the abnormal torque determination processing (including the calculation of the estimated torque $T_{act}$) is stopped, and the abnormality determination flag $F_{trq}$ is maintained at 1.

Details of the abnormal torque determination processing shown in S102 will be described below.

Figure 3:
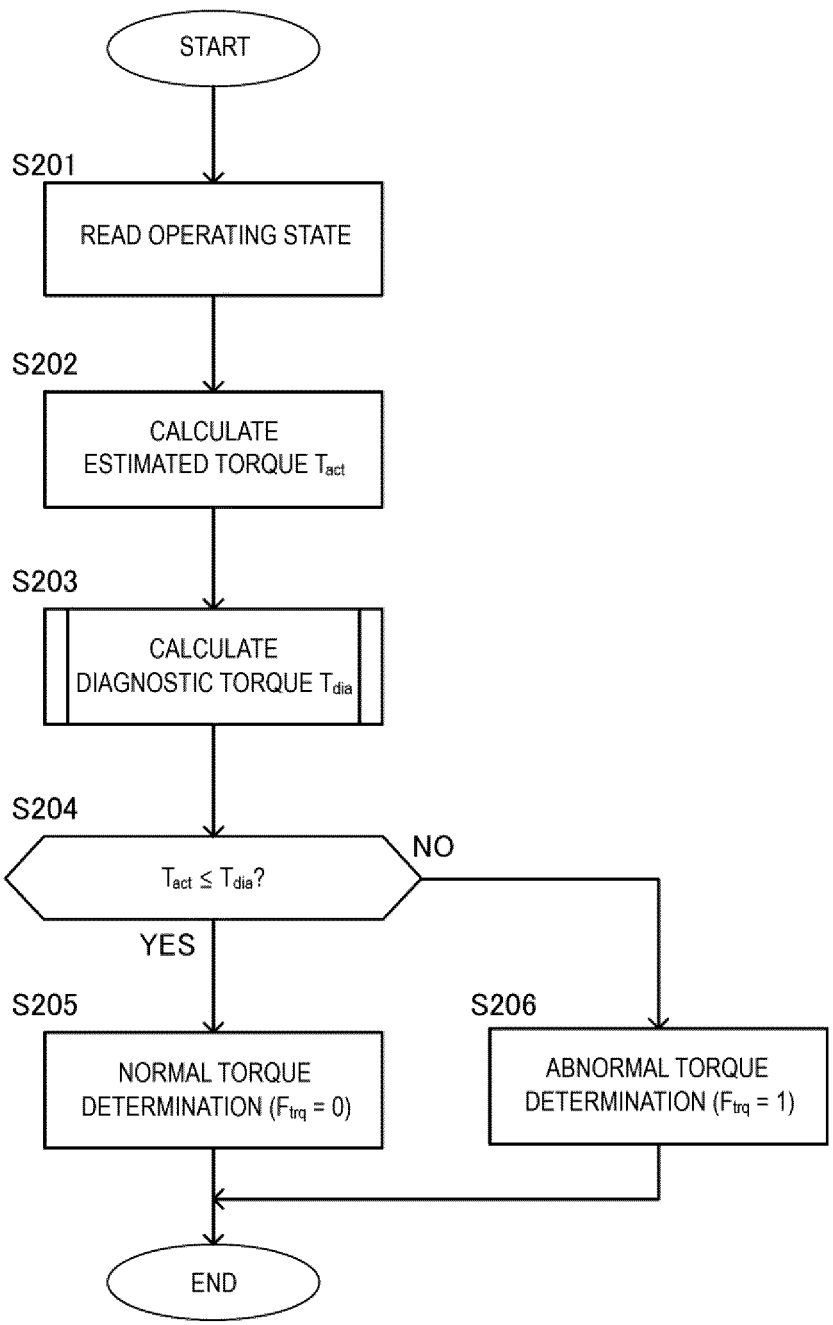
FIG. 3 is a flow chart showing details of abnormal torque determination processing.

FIG. 3 is a flow chart showing the details of the abnormal torque determination processing. Note that the electronic control unit 50 executes a control routine shown in FIG. 3 at a predetermined time interval.

In S201, as the parameters indicating the operating state of the engine 1, an intake air amount $Q_a$, the engine revolution speed $N_e$, the command torque $T_{trg}$ calculated in S103 and the like are read.

In S202, the estimated torque $T_{act}$ is calculated based on the intake air amount $Q_a$ and other required parameters.

In S203, the diagnostic torque $T_{dia}$ for monitoring an abnormal state of the engine 1 is calculated based on the command torque $T_{trg}$ and the engine revolution speed $N_e$. Details of the calculation of the diagnostic torque $T_{dia}$ will be described below.

Figure 4:
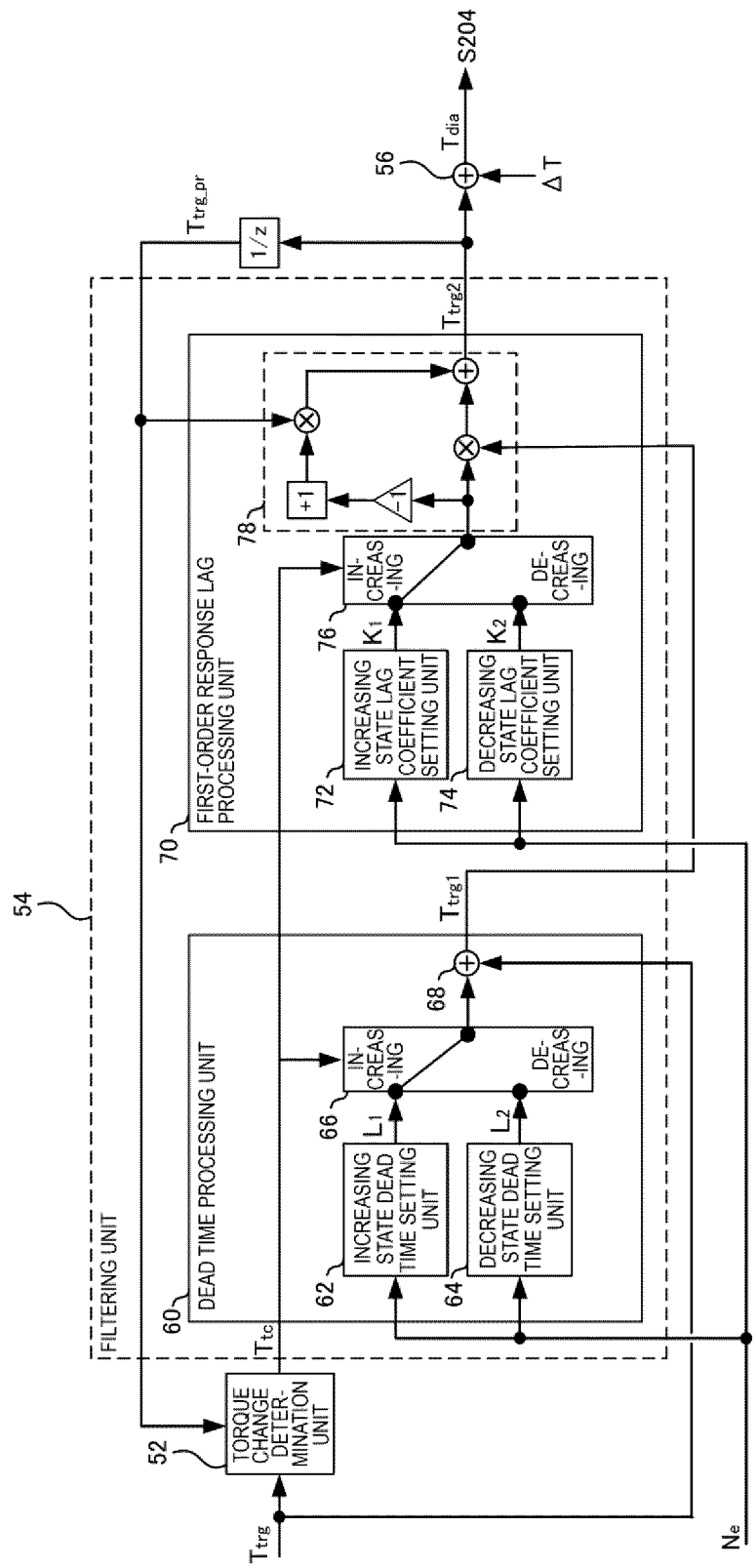
FIG. 4 is a block diagram illustrating a configuration for diagnostic torque calculation in an electronic control unit.

FIG. 4 is a block diagram illustrating a configuration for calculating the diagnostic torque $T_{dia}$.

As shown in the drawing, the electronic control unit 50 includes a torque change determination unit 52, a filtering unit 54, and a diagnostic torque calculation unit 56.

The torque change determination unit 52 receives the command torque $T_{trg}$ and a previous value of the command torque $T_{trg}$ (hereinafter also referred to as "previous command torque $T_{trg\_pr}$"), and determines whether a current state corresponds to a torque increasing state, a torque decreasing state, or a steady state. Here, the torque increasing state in the present embodiment means a state in which the engine torque T is actually increasing. The torque decreasing state means a state in which the engine torque T is actually decreasing. Furthermore, the steady state means a state in which the engine torque T is maintained without change over at least a control interval from the previous time to the current time.

More specifically, the torque change determination unit 52 determines that the torque is in the torque increasing state when a torque change amount δT obtained by subtracting the previous command torque $T_{trg\_pr}$ from the command torque $T_{trg}$ is a positive value, determines that the torque is the torque decreasing state when torque change amount δT is a negative value, and determines that the torque is the steady state when the torque change amount δT is 0. Furthermore, the torque change determination unit 52 outputs a signal indicating the determination result (hereinafter referred to as "torque state signal $S_{tc}$") to the filtering unit 54.

The filtering unit 54 obtains a corrected command torque $T_{trg2}$ by filtering and correcting the command torque $T_{trg}$ with reference to the torque state signal $S_{tc}$ generated by the torque change determination unit 52, the engine revolution speed $N_e$, and the previous command torque $T_{trg\_pr}$.

More specifically, the filtering unit 54 of the present embodiment includes a dead time processing unit 60 and a first-order response lag processing unit 70.

The dead time processing unit 60 calculates a dead time-imparted command torque $T_{trg1}$ from the command torque $T_{trg}$ and the engine revolution speed $N_e$ with reference to the torque state signal $S_{tc}$. Particularly, the dead time processing unit 60 defines a dead time L from the engine revolution speed $N_e$ according to a calculation algorithm that is individually set for the torque increasing state, the torque decreasing state, and the steady state, and then defines the dead time-imparted command torque $T_{trg1}$ by adding the dead time L to the command torque $T_{trg}$. Note that the dead time L in the present embodiment means a filter parameter suggesting a time until the engine torque T begins to respond to the change in the command torque $T_{trg}$. That is, the dead time L is a control parameter that suggests a time lag (dead time) from when a change of the command torque $T_{trg}$ begins to when the engine torque T actually begins to change due to the change, and is defined in consideration of stationary characteristics (such as operation delays of actuators and detection delays of sensors) of an engine control system that are related to a torque response performance. Particularly, the dead time L in the present embodiment is based on a basic value determined based on the stationary characteristics of the engine control system and subjected to appropriate adjustment (correction) according to the operating state of the engine 1, which will be described later, and thus is defined as a variable value according to the operating state of the engine 1.

More specifically, the dead time processing unit 60 of the present embodiment includes an increasing state dead time setting unit 62, a decreasing state dead time setting unit 64, a dead time selecting unit 66, and a calculation unit 68.

The increasing state dead time setting unit 62 refers to a predetermined revolution speed-dead time map for the torque increasing state, so as to define the dead time L (hereinafter referred to as "increasing state dead time $L_1$") from the engine revolution speed $N_e$. On the other hand, the decreasing state dead time setting unit 64 refers to a predetermined revolution speed-dead time map for the torque decreasing state, so as to define the dead time L (hereinafter referred to as "decreasing state dead time $L_2$") from the engine revolution speed $N_e$.

Figure 5A:
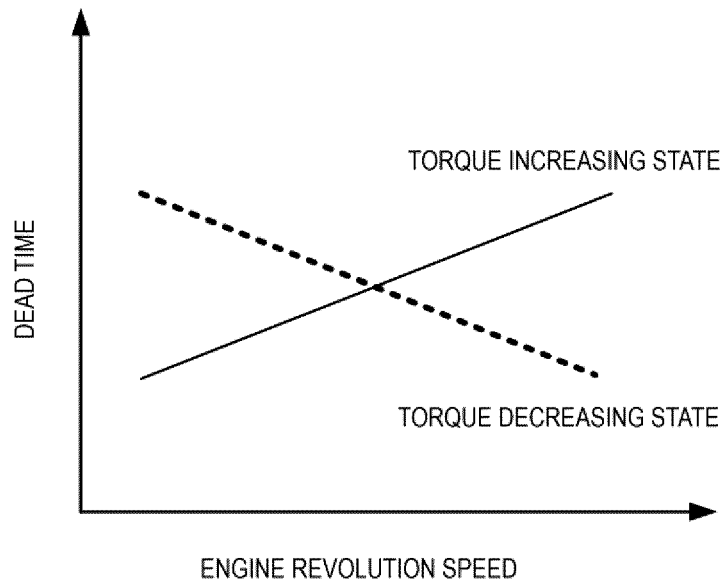
FIGS. 5A and 5B are maps of a dead time and a first-order lag coefficient defined according to an engine revolution speed.

FIG. 5A shows examples of the revolution speed-dead time map. As shown in the drawing, the revolution speed-dead time map of the present embodiment includes a revolution speed-dead time map for the torque increasing state (indicated by a solid line) and a revolution speed-dead time map for the torque decreasing state (indicated by a dashed line). Particularly, both of these maps are defined so that the increasing and decreasing directions of the dead time L tend to be opposite to the increasing and decreasing directions of the engine revolution speed $N_e$.

More specifically, the increasing state dead time $L_1$ defined by the revolution speed-dead time map for the torque increasing state is set to take a larger value as the engine revolution speed $N_e$ increases. On the other hand, the decreasing state dead time $L_2$ defined by the revolution speed-dead time map for the torque decreasing state is set to take a smaller value as the engine revolution speed $N_e$ increases. The reason why the increasing and decreasing directions of the dead time L are reversed with respect to the increasing and decreasing directions of the engine revolution speed $N_e$ in the torque increasing state and the torque decreasing state in this way is as follows.

Generally, in the torque increasing state, for the same engine torque T, the higher the engine revolution speed $N_e$, the higher an air density in the cylinder is required. Therefore, as the engine revolution speed $N_e$ increases, the required intake air amount increases. Therefore, in the torque increasing state, response of the engine torque T is delayed as the engine revolution speed $N_e$ increases. In consideration of this point, in the present embodiment, the increasing state dead time $L_1$ is defined to take a higher value as the engine revolution speed $N_e$ increases. On the other hand, in the torque decreasing state, for the same engine torque T, the higher the engine revolution speed $N_e$, the higher an air intake speed. Therefore, in the torque decreasing state, the response of the torque is quicker as the engine revolution speed $N_e$ increases. In consideration of this point, in the present embodiment, the decreasing state dead time $L_2$ is defined to take a lower value as the engine revolution speed $N_e$ increases.

Then, the increasing state dead time setting unit 62 and the decreasing state dead time setting unit 64 output the defined increasing state dead time $L_1$ and the decreasing state dead time $L_2$ to the dead time selecting unit 66.

The dead time selecting unit 66 refers to the torque state signal $S_{tc}$ and then outputs either the increasing state dead time $L_1$ or the decreasing state dead time $L_2$ to the calculation unit 68 as the dead time L to be used in subsequent calculation. More specifically, the dead time selecting unit 66 outputs the increasing state dead time $L_1$ as the dead time L when the torque state signal $S_{tc}$ indicates the torque increasing state. The dead time selecting unit 66 outputs the decreasing state dead time $L_2$ as the dead time L when the torque state signal $S_{tc}$ indicates the torque decreasing state. Note that when the torque state signal $S_{tc}$ indicates the steady state, the dead time selecting unit 66 outputs the previous value of the dead time L as it is as the dead time L in the current control cycle.

The calculation unit 68 adds the dead time L output from the dead time selecting unit 66 to the command torque $T_{trg}$ to obtain the dead time-imparted command torque $T_{trg1}$.

Next, the first-order response lag processing unit 70 will be described. The first-order response lag processing unit 70 refers to the torque state signal $S_{tc}$, and then calculates the corrected command torque $T_{trg2}$ from the dead time-imparted command torque $T_{trg1}$ calculated by the dead time processing unit 60, the previous command torque $T_{trg\_pr}$, and the engine revolution speed $N_e$. Particularly, the first-order response lag processing unit 70 defines a first-order lag coefficient K from the engine revolution speed $N_e$ according to a calculation algorithm that is individually set for the torque increasing state, the torque decreasing state, and the steady state, and then defines the corrected command torque $T_{trg2}$ by performing a predetermined correction calculation on the dead time-imparted command torque $T_{trg1}$ using the first-order lag coefficient K and the previous command torque $T_{trg\_pr}$. Here, the first-order lag coefficient K in the present embodiment means a filter parameter that suggests a level of following performance of the engine torque T to the change in the command torque $T_{trg}$. The first-order lag coefficient K is a control parameter that suggests a speed at which the engine torque T reaches the command torque $T_{trg}$ after the engine torque T begins to change due to the change in the command torque $T_{trg}$. Note that the first-order lag coefficient K is defined according to characteristics of the engine control system (operation delay of each actuator, detection delay of sensors, and the like) that are related to the torque response performance. Particularly, the first-order lag coefficient K in the present embodiment is based on a basic value determined based on the stationary characteristics of the engine control system and subjected to appropriate adjustment (correction) according to the operating state of the engine 1, which will be described later, and thus is defined as a variable value according to the operating state of the engine 1.

Particularly, the first-order response lag processing unit 70 of the present embodiment includes an increasing state lag coefficient setting unit 72, a decreasing state lag coefficient setting unit 74, a coefficient selecting unit 76, and a calculation unit 78.

The increasing state lag coefficient setting unit 72 refers to a predetermined revolution speed-lag coefficient map for the torque increasing state to define the first-order lag coefficient K (hereinafter, also referred to as "increasing state lag coefficient $K_1$") from the engine revolution speed $N_e$. On the other hand, the decreasing state lag coefficient setting unit 74 refers to a predetermined revolution speed-lag coefficient map for the torque decreasing state to define the first-order lag coefficient K (hereinafter, also referred to as "decreasing state lag coefficient $K_2$") from the engine revolution speed $N_e$.

Figure 5B:
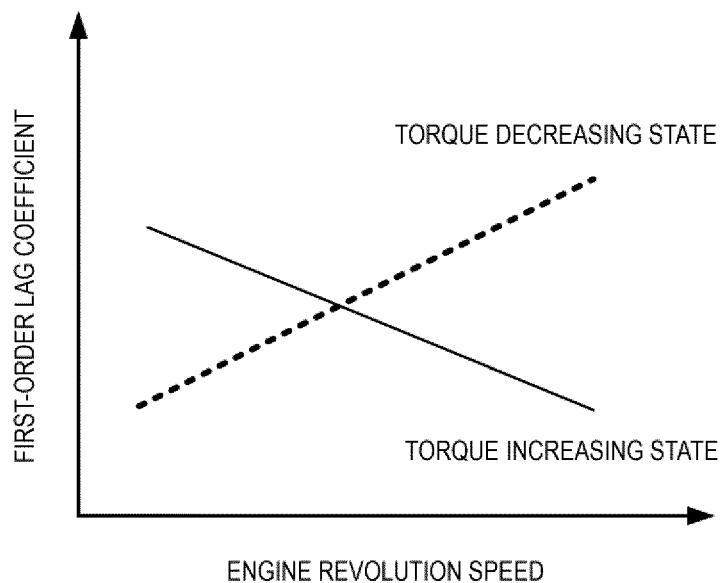

FIG. 5B shows examples of the revolution speed-lag coefficient map. As shown in the drawing, the revolution speed-lag coefficient map of the present embodiment includes a lag coefficient map for the torque increasing state (indicated by a solid line) and a lag coefficient map for the torque decreasing state (indicated by a dashed line). Particularly, both of these maps are defined so that the increasing and decreasing directions of the engine revolution speed $N_e$ tend to be opposite to the increasing and decreasing directions of the first-order lag coefficient K.

More specifically, the increasing state lag coefficient $K_1$ defined by the revolution speed-lag coefficient map for the torque increasing state is set to take a smaller value as the engine revolution speed $N_e$ increases. On the other hand, the decreasing state lag coefficient $K_2$ defined by the revolution speed-lag coefficient map for the torque decreasing state is set to take a larger value as the engine revolution speed $N_e$ increases.

The reason why the increasing and decreasing directions of the first-order lag coefficient K are reversed with respect to the increasing and decreasing directions of the engine revolution speed $N_e$ in the torque increasing state and the torque decreasing state in this way is the same as the reason why the increasing and decreasing directions of the dead time L are reversed with respect to the increasing and decreasing directions of the engine revolution speed $N_e$.

That is, in the revolution speed-lag coefficient map for the torque increasing state, the increasing state lag coefficient $K_1$ is defined to take a smaller value as the engine revolution speed $N_e$ increases considering that the response of the engine torque T is delayed as the engine revolution speed $N_e$ increases. On the other hand, in the revolution speed-lag coefficient map for the torque decreasing state, the decreasing state lag coefficient $K_2$ is defined to take a larger value as the engine revolution speed $N_e$ increases considering that the response of the engine torque T is quicker as the engine revolution speed $N_e$ increases.

Then, the increasing state lag coefficient setting unit 72 and the decreasing state lag coefficient setting unit 74 output the defined increasing state lag coefficient $K_1$ and the decreasing state lag coefficient $K_2$ to the coefficient selecting unit 76.

The coefficient selecting unit 76 refers to the torque state signal $S_{tc}$ and then outputs either the increasing state lag coefficient $K_1$ or the decreasing state lag coefficient $K_2$ to the calculation unit 78 as the first-order lag coefficient K to be used in subsequent calculation. More specifically, the coefficient selecting unit 76 outputs the increasing state lag coefficient $K_1$ as the first-order lag coefficient K when the torque state signal $S_{tc}$ indicates the torque increasing state. The coefficient selecting unit 76 outputs the decreasing state lag coefficient $K_2$ as the first-order lag coefficient K when the torque state signal $S_{tc}$ indicates the torque decreasing state. Note that when the torque state signal $S_{tc}$ indicates the steady state, the coefficient selecting unit 76 outputs the previous value of the first-order lag coefficient K as it is as the first-order lag coefficient K in the current control cycle.

The calculation unit 78 obtains the corrected command torque $T_{trg2}$ by adding a value obtained by inverting a sign of the first-order lag coefficient K, adding "1", and multiplying it by the previous command torque $T_{trg\_pr}$, to a value obtained by multiplying the dead time-imparted command torque $T_{trg1}$ by the first-order lag coefficient K.

Note that the calculation for obtaining the corrected command torque $T_{trg2}$ from the command torque $T_{trg}$ by the dead time processing unit 60 and the first-order response lag processing unit 70 described above can be expressed by the following equation (1).

[Eq. 1]

$$T_{trg2} = T_{trg\_pr} \cdot (1-K) + (T_{trg}+L) \cdot K \qquad (1)$$

Returning to FIG. 4, the diagnostic torque calculation unit 56 calculates the diagnostic torque $T_{dia}$ by adding a predetermined threshold $\Delta T$ to the corrected command torque $T_{trg2}$. Here, the diagnostic torque $T_{dia}$ of the present embodiment is defined as an upper limit value of an allowable torque range in which a torque state can be determined to be normal from a relation with the command torque $T_{trg}$. Therefore, the threshold $\Delta T$ is set to an appropriate value (particularly a fixed value that does not depend on the operating state of the engine 1) as a difference between the upper limit value and the corrected command torque $T_{trg2}$. Note that a configuration may be adopted in which the corrected command torque $T_{trg2}$ itself is set as the upper limit value of the allowable torque range. That is, a configuration may be adopted in which the threshold $\Delta T$ is set to 0 and the diagnostic torque $T_{dia}$ is set to the same value as the corrected command torque $T_{trg2}$.

Figure 6:
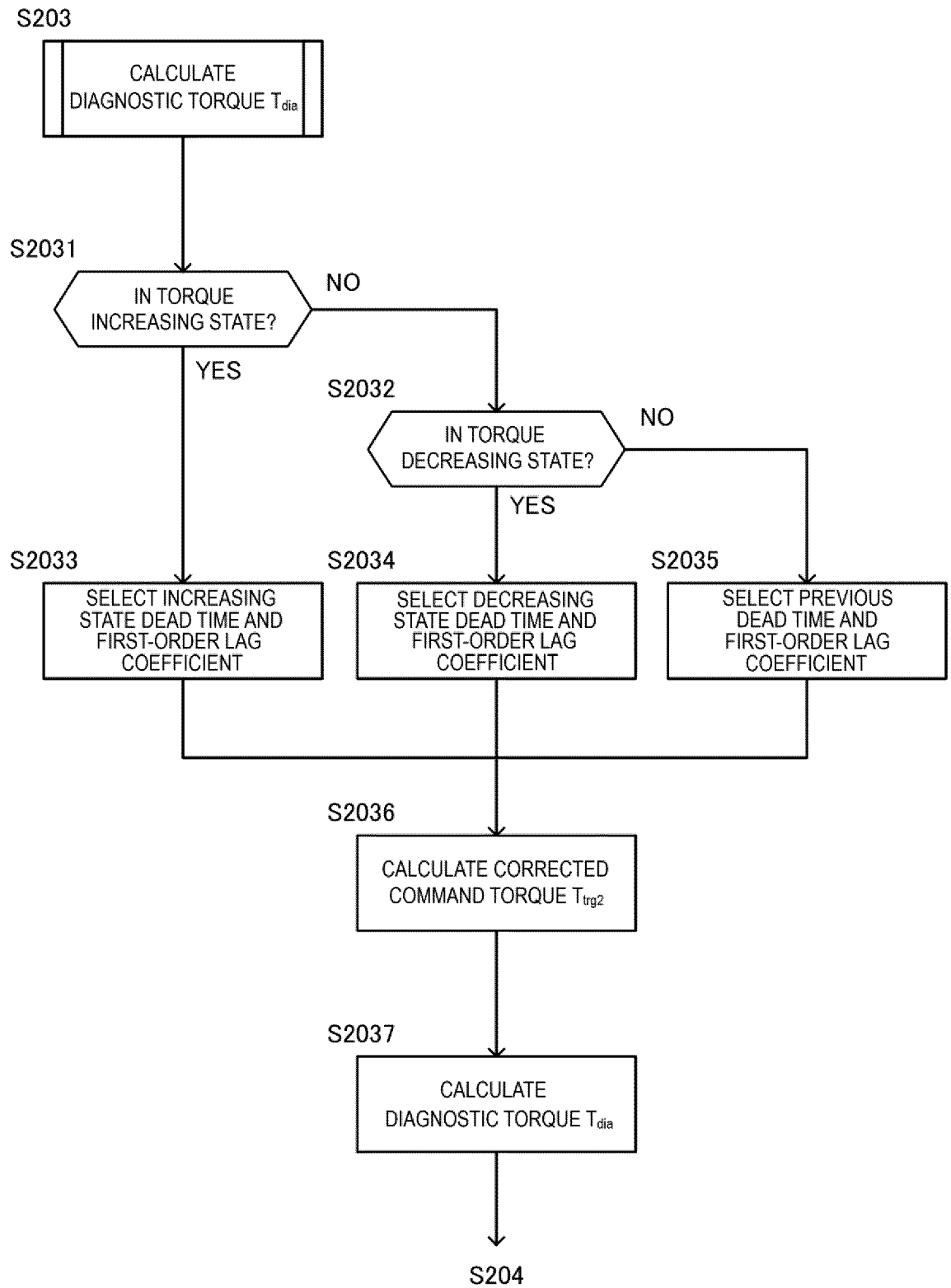
FIG. 6 is a flow chart showing an overall processing flow of the diagnostic torque calculation.

FIG. 6 is a flow chart showing an overall processing flow of the above calculation of the diagnostic torque $T_{dia}$. As shown in the drawing, in the calculation of the diagnostic torque $T_{dia}$ according to the present embodiment, in the torque increasing state (Yes in S2031), the command torque $T_{trg}$ is filtered using the increasing state dead time $L_1$ and the increasing state lag coefficient $K_1$ to calculate the corrected command torque $T_{trg2}$ (S2033 and S2036), and then the diagnostic torque $T_{dia}$ is obtained from the corrected command torque $T_{trg2}$ (S2037).

On the other hand, in the torque decreasing state (No in S2031 and Yes in S2032), the command torque $T_{trg}$ is filtered using the decreasing state dead time $L_2$ and the decreasing state lag coefficient $K_2$ to calculate the corrected command torque $T_{trg2}$ (S2034 and S2036), and then the diagnostic torque $T_{dia}$ is obtained from the corrected command torque $T_{trg2}$ (S2037).

Furthermore, in the steady state (No in S2031 and No in S2032), the corrected command torque $T_{trg2}$ is calculated while the dead time L and the first-order lag coefficient K are held at the previous values (S2035 and S2036), and then the diagnostic torque $T_{dia}$ is obtained from the corrected command torque $T_{trg2}$ (S2037). Note that in the steady state, since the previous command torque $T_{trg\_pr}$ and the current command torque $T_{trg}$ are the same, even after being filtered by the filtering unit 54, the command torque $T_{trg}$ is output to the diagnostic torque calculation unit 56 as it is without being substantially corrected. Therefore, with the above-described calculation logic, even in the steady state in which correction of the command torque $T_{trg}$ is not substantially required, the diagnostic torque $T_{dia}$ can be appropriately obtained in the same manner as when the calculation logic for the correction is not adopted.

Returning to FIG. 3, in the processing of S203, after the diagnostic torque $T_{dia}$ is obtained, the processing of S204 is executed. In S204, it is determined whether the estimated torque $T_{act}$ is equal to or less than the diagnostic torque $T_{dia}$. If the estimated torque $T_{act}$ is equal to or less than the diagnostic torque $T_{dia}$, the processing proceeds to S205, and if the estimated torque $T_{act}$ exceeds the diagnostic torque $T_{dia}$, the processing proceeds to S206.

In S205, the abnormality determination flag $F_{trq}$ is set to 0 on the assumption that the engine torque T is reduced to the diagnostic torque $T_{dia}$ or less and the engine control is normally performed.

On the other hand, in S206, the abnormality determination flag $F_{trq}$ is set to 1 on the assumption that the engine torque T is excessively large and that some failure occurs in the engine control. Note that from the viewpoint of more reliably preventing false detection of the abnormal state, a configuration may be adopted in which the abnormality determination flag $F_{trq}$ is set to 1 when the estimated torque $T_{act}$ is determined to exceed the diagnostic torque $T_{dia}$ multiple times, and otherwise, the abnormality determination flag $F_{trq}$ is maintained at 0.

According to the engine diagnosis method of the present embodiment described above, the command torque $T_{trg}$ is corrected by filtering using the filter parameters that are appropriately determined according to the amount of change in the command torque $T_{trg}$ indicating the operating state of the engine 1 and the level of the engine revolution speed $N_e$, and then the diagnostic torque $T_{dia}$ can be defined from the command torque $T_{trg}$ after the correction (corrected command torque $T_{trg2}$).

Note that in the present embodiment, examples are described in which the filter parameters (dead time L and first-order lag coefficient K) are obtained from the engine revolution speed $N_e$ by referring to the maps that are individually defined for each of the torque increasing state and the torque decreasing state. However, the calculation logic for defining the appropriate filter parameter with reference to the operating state of the engine 1 is not limited to the above examples. For example, as described below, in the torque increasing state and the torque decreasing state, a configuration may be adopted in which instead of or together with the map that defines the relation between the engine revolution speed $N_e$ and the filter parameter, a map that defines a relation between the engine torque T and the filter parameter is prepared, and the filter parameter is obtained from a control parameter suggesting the engine torque T (specifically, the command torque $T_{trg}$ or the estimated torque $T_{act}$).

Figure 7A:
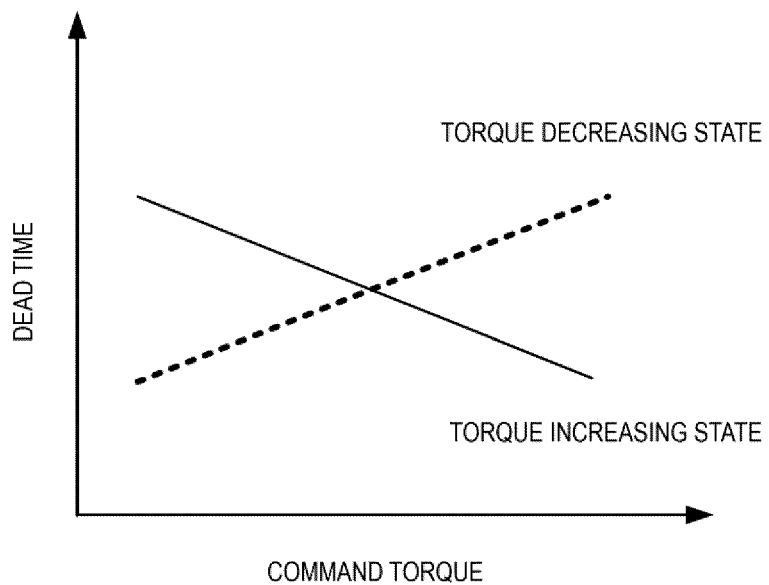
FIGS. 7A and 7B are maps of the dead time and the first-order lag coefficient defined according to an engine torque.
Figure 7B:
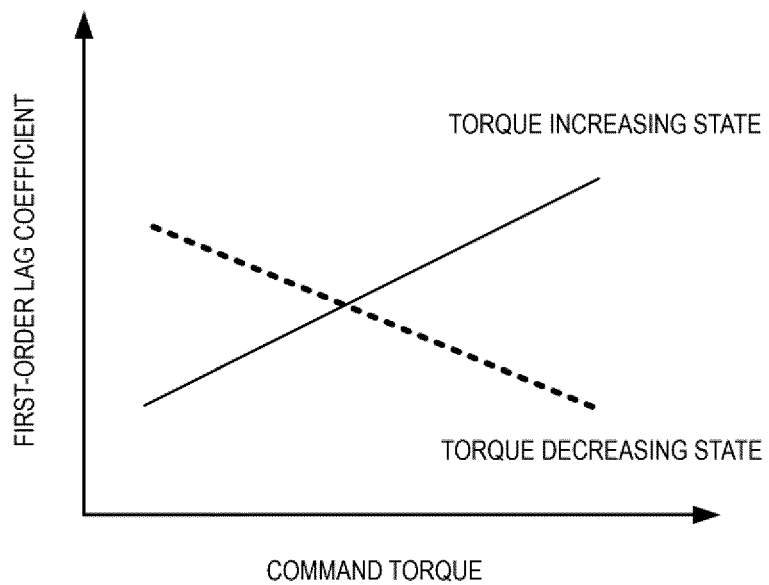

FIGS. 7A and 7B show examples of the map that defines the relation between the engine torque T and the filter parameter (dead time L or first-order lag coefficient K). Particularly, as shown in FIG. 7A, a torque-dead time map may be adopted in which a map for the torque increasing state (indicated by a solid line) and a map for the torque decreasing state (indicated by a dashed line) are separately set. As shown in FIG. 7B, a torque-lag coefficient map may be adopted in which a map for the torque increasing state (indicated by a solid line) and a map for the torque decreasing state (indicated by a dashed line) are separately set.

Furthermore, in the present embodiment, examples are described in which whether the torque change amount δT ($=T_{trg}-T_{trg\_pr}$) is positive or negative is determined so as to estimate whether the current state is the torque increasing state or the torque decreasing state, and then the filter parameter is defined from the operating state of the engine 1 (engine revolution speed $N_e$ or engine torque T) using the maps defined separately for the torque increasing state and the torque decreasing state. However, the present invention is not limited thereto, and a configuration may be adopted in which a map that defines a relation between the operating state of the engine 1 and the filter parameter is adjusted by referring to the magnitude of the torque change amount δT. For example, the revolution speed-dead time map for the torque increasing state shown in FIG. 5A may be defined such that the larger the torque change amount δT (>0) (the higher a torque increasing rate), the larger the dead time L (increasing state dead time $L_1$) with respect to the engine revolution speed $N_e$ (the larger a slope of the solid line graph shown in the drawing). The revolution speed-dead time map for the torque decreasing state shown in FIG. 5A may be defined such that the smaller the torque change amount δT (<0) (the higher a torque decreasing rate), the smaller the dead time L (decreasing state dead time $L_2$) with respect to the engine revolution speed $N_e$ (the smaller a slope of the dashed line graph shown in the drawing). The revolution speed-lag coefficient map may also be adjusted according to the torque change amount from the same viewpoint. As a result, it is possible to define an appropriate filter parameter while also considering the degree of change in the operating state of the engine 1.

[Explanation by Time Chart]

Figure 8A:
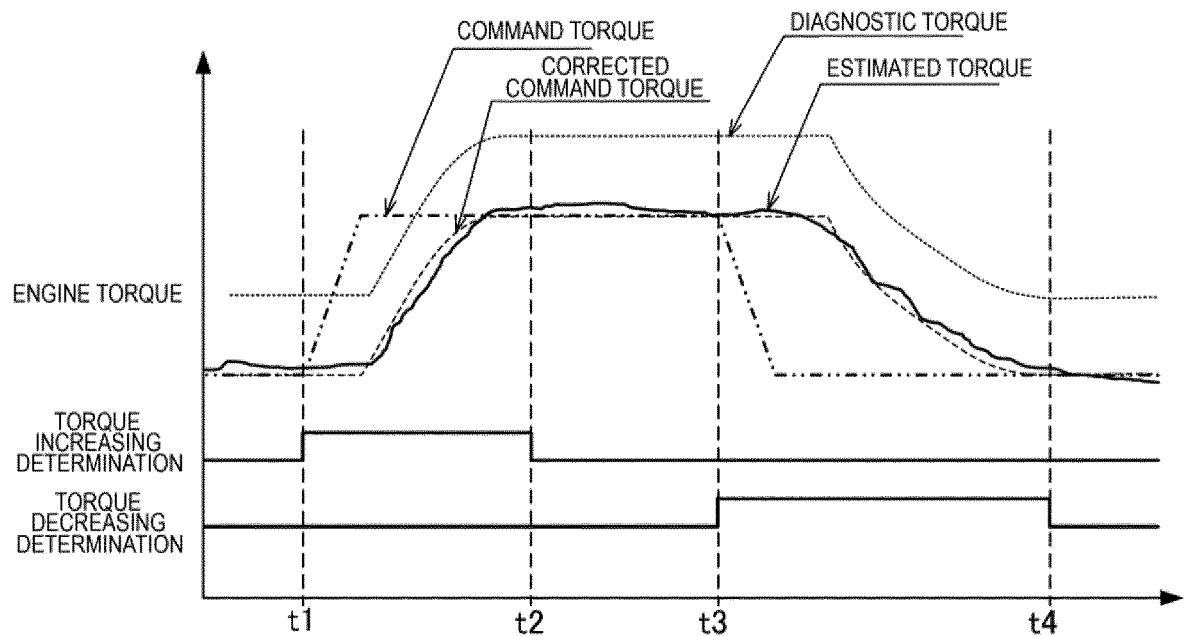
FIGS. 8A and 8B are explanatory diagrams showing operation of the electronic control unit regarding the abnormal torque determination.
Figure 8B:
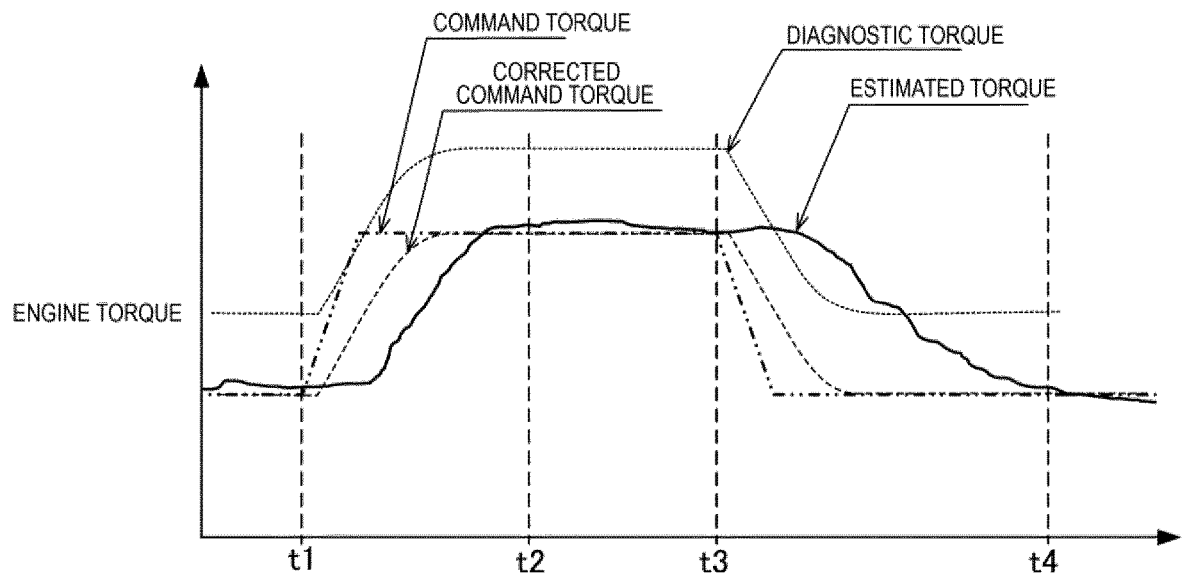

FIGS. 8A and 8B are explanatory diagrams showing the operation of the electronic control unit 50 regarding the abnormal torque determination. Particularly, FIG. 8A shows a control result by the engine diagnosis method of an example (the above embodiment), and FIG. 8B shows a control result by an engine diagnosis method of a comparative example. Note that the comparative example is assumed as an engine diagnosis method that differs from the example in that the dead time L and the first-order lag coefficient K, which are the filter parameters, are fixed values that do not depend on the operating state of the engine 1, and is common to the example in other points.

First, in the control of the comparative example shown in FIG. 8B, during the torque increasing state (from a time t1 to a time t2), the corrected command torque $T_{trg2}$ obtained by filtering the command torque $T_{trg}$ changes along a profile of the actually output engine torque T (≈estimated torque $T_{act}$) with a delay with respect to the command torque $T_{trg}$. Therefore, the diagnostic torque $T_{dia}$ obtained by adding the threshold ΔT to the corrected command torque $T_{trg2}$ also generally changes along a profile of the estimated torque $T_{act}$. Therefore, the abnormality determination of the engine torque T (determination that the estimated torque $T_{act}$ exceeds the diagnostic torque $T_{dia}$) is also appropriately performed.

On the other hand, during the torque decreasing state (from a time t3 to a time t4), in the control of the comparative example, the corrected command torque $T_{trg2}$ is calculated using a filter in which the dead time L and the first-order lag coefficient K are defined to take the same values as those during the torque increasing state. However, the torque response characteristic in the engine control system during the torque decreasing state is different from that during the torque increasing state. For this reason, the diagnostic torque $T_{dia}$ obtained from the corrected command torque $T_{trg2}$ defined using the same filter as that for the torque increasing state deviates from the actually output engine torque T (estimated torque $T_{act}$) in their response behavior to the change in the command torque $T_{trg}$. More specifically, as indicated by a two-dot chain line graph, a solid line graph, and a dotted line graph in FIG. 8B, since the diagnosis torque $T_{dia}$ decreases faster than the estimated torque $T_{act}$ with respect to a decrease in the command torque $T_{trg}$, there occurs a section in which the diagnostic torque $T_{dia}$ is lower than the estimated torque $T_{act}$. As a result, in this section, it is detected that the estimated torque $T_{act}$ exceeds the diagnostic torque $T_{dia}$ (No in S204 in FIG. 3), and it may lead to an erroneous abnormal torque determination.

On the other hand, in the control of the example shown in FIG. 8A, during the torque increasing state and the torque decreasing state, a filter is adopted in which the filter parameters (dead time L and first-order lag coefficient K) are individually adjusted in consideration of the difference in the torque response characteristic between scenes. Therefore, the diagnostic torque $T_{dia}$ obtained from the corrected command torque $T_{trg2}$ calculated using the filter can bring the response behavior to the change in the command torque $T_{trg}$ closer to that in the estimated torque $T_{act}$ in both the scenes, which are the torque increasing state and the torque decreasing state. Therefore, it is possible to suppress occurrence of the erroneous abnormal torque determination as described above. That is, the diagnostic accuracy for the engine 1 can be maintained regardless of the operating state of the engine 1 (whether the torque is in the torque increasing state or the torque decreasing state).

Description of Functions and Effects

Functions and effects obtained by the present embodiment will be collectively described below.

The present embodiment provides the engine diagnosis method, including: a step of calculating the corrected command torque $T_{trg2}$ by correcting the command torque $T_{trg}$ of the engine 1 with the correction amount according to the response characteristic of the engine torque T actually output with respect to the command torque $T_{trg}$; and a step of diagnosing the state of the engine torque T by comparing the diagnostic torque $T_{dia}$ determined based on the corrected command torque $T_{trg2}$ and the estimated torque $T_{act}$. In this engine diagnosis method, the correction amount is adjusted with reference to the operating state of the engine 1.

As a result, the diagnostic torque $T_{dia}$ can be defined from the command torque $T_{trg}$ in consideration of the difference in the response characteristic of the engine torque T according to the change in the operating state of the engine 1. That is, the influence of the change in the response characteristic according to the operating state of the engine 1 can be more reliably reflected in the calculation of the diagnostic torque $T_{dia}$. According to the above embodiment, it is possible to ensure the accuracy in diagnosing the state of the engine torque T regardless of the operating state of the engine 1.

Particularly, in the present embodiment, the operating state of the engine 1 includes the engine torque T, the amount of change in the engine torque T (torque change amount δT), and the engine revolution speed $N_e$. The corrected command torque $T_{trg2}$ is calculated by applying the filter defined by the filter parameter (L, K) suggesting the response characteristic to the command torque $T_{trg}$. Furthermore, the correction amount is adjusted by setting the filter parameter (L, K) to a variable value according to at least one of the engine torque T, the torque change amount δT, and the engine revolution speed $N_e$.

As a result, the calculation for obtaining the corrected command torque $T_{trg2}$ from the command torque $T_{trg}$ can be performed by filtering. Moreover, a specific calculation logic for adjusting the correction amount for the command torque $T_{trg}$ can be achieved by a simple method of varying the filter parameter according to each parameter indicating the operating state of the engine 1.

Furthermore, in the present embodiment, as the filter parameter (L, K), a first filter parameter ($L_1$, $K_1$) defined according to the response characteristic when the engine torque T increases and a second filter parameter ($L_2$, $K_2$) defined according to the response characteristic when the engine torque T decreases are set (the increasing state dead time setting unit 62, decreasing state dead time setting unit 64, increasing state lag coefficient setting unit 72, and decreasing state lag coefficient setting unit 74 in FIG. 4).

Whether the current state of the engine torque T is in the increasing state (in the torque increasing state) or in the decreasing state (in the torque decreasing state) is determined with reference to the torque change amount δT (torque change determination unit 52). Then, in the torque increasing state (Yes in S2031 in FIG. 6), a filter defined by the first filter parameter ($L_1$, $K_1$) is applied to calculate the corrected command torque $T_{trg2}$ (S2033 and S2036). On the other hand, in the torque decreasing state (No in S2031), a filter defined by the second filter parameter ($L_2$, $K_2$) is applied to calculate the corrected command torque $T_{trg2}$ (S2034 and S2036).

As a result, in both the torque increasing state and the torque decreasing state where the response characteristics of the engine torque T are different from each other, the filter can be defined individually for each state in consideration of the difference in the response characteristic. Therefore, in both scenes of the torque increasing state and the torque decreasing state, a more specific calculation logic for defining the diagnostic torque $T_{dia}$ (corrected command torque $T_{trg2}$) that matches the response behavior of the actual engine torque T with respect to the change in the command torque $T_{trg}$ is achieved.

Particularly, when the engine diagnosis method of the present embodiment is applied to the engine 1 mounted as the drive source of the vehicle described above, in both a typical vehicle acceleration scene as the torque increasing state and a typical vehicle deceleration scene as the torque decreasing state, the diagnostic accuracy for the engine 1 can be ensured. More specifically, in the engine 1 used as the drive source for the vehicle, it is assumed that the engine torque T is frequently changed during the operation of the engine 1, such as acceleration and deceleration requests for the vehicle in response to operation on the accelerator by the driver. In this regard, with the calculation logic adopted in the engine diagnosis method, it is possible to ensure the diagnostic accuracy for the state of the engine torque T even in such a scene in which the engine torque T is frequently changed.

Furthermore, in the present embodiment, the filter parameter (L, K) includes the dead time L suggesting a time until the engine torque T begins to respond to the change in the command torque $T_{trg}$, and the first-order lag coefficient K suggesting the level of following performance to the command torque $T_{trg}$ after the engine torque T begins to respond. The dead time L (increasing state dead time $L_1$) and the first-order lag coefficient K (increasing state lag coefficient $K_1$) in the first filter parameter ($L_1$, $K_1$) and the dead time L (decreasing state dead time $L_2$) and the first-order lag coefficient K (decreasing state lag coefficient $K_2$) in the second filter parameter ($L_2$, $K_2$) are separately set.

In this way, a more specific calculation logic is achieved for defining the filter parameter (L, K) that reflects the difference in the response characteristic of the engine torque T between the torque increasing state and the torque decreasing state.

Particularly, in the present embodiment, the increasing state dead time $L_1$ in the first filter parameter is set to be larger as the engine revolution speed $N_e$ is higher and/or as the engine torque T is smaller (see the solid line graph in FIG. 5A and the solid line graph in FIG. 7A). The increasing state lag coefficient $K_1$ in the first filter parameter is set to be smaller as the engine revolution speed $N_e$ is higher and/or as the engine torque T is smaller (see the dashed line graph in FIG. 5A and the dashed line graph in FIG. 7A).

In this way, a more specific calculation logic is achieved for defining the first filter parameter ($L_1$, $K_1$) that more appropriately reflects the difference in the torque response characteristic of the engine control system according to the magnitude of the engine revolution speed $N_e$ or the engine torque T in the torque increasing state.

In the present embodiment, the decreasing state dead time $L_2$ in the second filter parameter is set to be smaller as the engine revolution speed $N_e$ is higher and/or as the engine torque T is smaller (see the solid line graph in FIG. 5B and the solid line graph in FIG. 7B). The decreasing state lag coefficient $K_2$ in the second filter parameter ($L_2$, $K_2$) is set to be larger as the engine revolution speed $N_e$ is higher and/or as the engine torque T is smaller (see the dashed line graph in FIG. 5B and the dashed line graph in FIG. 7B).

In this way, a more specific calculation logic is achieved for defining the second filter parameter ($L_2$, $K_2$) that more appropriately reflects the difference in the torque response characteristic of the engine control system according to the magnitude of the engine revolution speed $N_e$ or the engine torque T in the torque decreasing state.

Furthermore, the present embodiment provides the electronic control unit 50 that functions as an engine diagnosis device suitable for executing the above engine diagnosis method. The electronic control unit 50 executes the step of calculating the corrected command torque $T_{trg2}$ by correcting the command torque $T_{trg}$ of the engine 1 with the correction amount according to the response characteristic of the engine torque T actually output with respect to the command torque $T_{trg}$; and the step of diagnosing the state of the engine torque T by comparing the diagnostic torque $T_{dia}$ determined based on the corrected command torque $T_{trg2}$ and the estimated torque $T_{act}$. Particularly, the electronic control unit 50 adjusts the correction amount with reference to the operating state of the engine 1.

Although the embodiments of the present invention have been described, the above embodiments are merely a part of application examples of the present invention, and do not mean that the technical scope of the present invention is limited to the specific configurations of the above embodiments.

For example, in the above embodiment, an example in which the engine diagnosis method is applied to the engine 1 mounted as a drive source of the vehicle is described. However, the present invention is not limited thereto, and the engine diagnosis method according to the present invention may be applied when the engine 1 is applied to other applications. For example, when the engine 1 is used only as a drive device for a generator in an electric vehicle (when the engine 1 does not function as a drive source), and the command torque $T_{trg}$ is changed according to a predetermined required power, a configuration may be adopted in which the correction amount (particularly, the above filter parameter) for defining the diagnostic torque $T_{dia}$ (corrected command torque $T_{trg2}$) from the command torque $T_{trg}$ is made variable according to the operating state of the engine 1. Furthermore, the engine diagnosis method according to the present invention may be applied to applications other than vehicle-mounted applications that require changing the operating state at a constant frequency while the engine 1 is in operation.

Furthermore, the filter parameter is not limited to the dead time L and the first-order lag coefficient K. In other words, as the filter parameter, other than these parameters described above, any parameter that can suggest the response characteristic of the engine torque T can be used, depending on a type of the filter to be used. Moreover, a specific aspect of calculating the corrected command torque $T_{trg2}$ from the command torque $T_{trg}$ based on the operating state of the engine 1 is not limited to the filtering, and any calculation logic capable of achieving the same function may be adopted. For example, a configuration may be adopted in which a relation between an assumed operating state of the engine 1 and an appropriate correction amount for the operating state is experimentally investigated and mapped, and then the corrected command torque $T_{trg2}$ is calculated from the command torque $T_{trg}$ by referring to the map.

The invention claimed is:

1. An engine diagnosis method, comprising:
   a step of calculating a corrected command torque by correcting a command torque of an engine according to a response characteristic of an estimated value of engine torque actually output with respect to the command torque, wherein calculating the corrected command torque comprises:
   determining whether the engine torque is in an increasing state or a decreasing state based on an amount of change in the engine torque;
   upon determining that the engine torque is in the increasing state, applying a filter defined by a first filter parameter to the command torque; and
   upon determining that the engine torque is in the decreasing state, applying a filter defined by a second filter parameter to the command torque;
   a step of diagnosing a state of the engine torque by comparing a diagnostic torque defined based on the corrected command torque to the estimated value; and
   a step of limiting the engine torque to a value smaller than the command torque upon determining that the estimated value exceeds the diagnostic torque.

2. The engine diagnosis method according to claim 1, wherein
   calculating the corrected command torque is further based on an engine revolution speed.

3. The engine diagnosis method according to claim 2, wherein
   the first filter parameter or the second filter parameter includes a dead time suggesting a time until the engine torque begins to respond to a change in the command torque, and a first-order lag coefficient suggesting a level of following performance to the command torque after the engine torque begins to respond, and
   the dead time and the first-order lag coefficient in the first filter parameter and the dead time and the first-order lag coefficient in the second filter parameter are separately set.

4. The engine diagnosis method according to claim 3, wherein
   the dead time in the first filter parameter is set to be larger as the engine revolution speed is higher and/or as the engine torque is smaller, and
   the first-order lag coefficient in the first filter parameter is set to be smaller as the engine revolution speed is higher and/or as the engine torque is smaller.

5. The engine diagnosis method according to claim 3, wherein
   the dead time in the second filter parameter is set to be smaller as the engine revolution speed is higher and/or as the engine torque is smaller, and
   the first-order lag coefficient in the second filter parameter is set to be larger as the engine revolution speed is higher and/or as the engine torque is smaller.

6. An engine diagnosis device comprising a processor programmed to:
- calculate a corrected command torque by correcting a command torque of an engine according to a response characteristic of an estimated value of engine torque actually output with respect to the command torque, wherein calculating the corrected command torque comprises:
  - determining whether the engine torque is in an increasing state or a decreasing state based on an operating state of the engine, the operating state of the engine including an amount of change in the engine torque;
  - upon determining that the engine torque is in the increasing state, applying a filter defined by a first filter parameter to the command torque; and
  - upon determining that the engine torque is in the decreasing state, applying a filter defined by a second filter parameter to the command torque;
- diagnose a state of the engine torque by comparing a diagnostic torque defined based on the corrected command torque to the estimated value;
- limit the engine torque to a value smaller than the command torque upon determining that the estimated value exceeds the diagnostic torque; and.

* * * * *